United States Patent
Trippe et al.

(10) Patent No.: US 9,694,408 B2
(45) Date of Patent: Jul. 4, 2017

(54) HOT FORMING LINE AND METHOD FOR PRODUCING A HOT FORMED AND PRESS HARDENED MOTOR VEHICLE PART

(71) Applicant: Benteler Automobiltechnik GmbH, Paderborn (DE)

(72) Inventors: Carsten Trippe, Salzkotten (DE); Dieter Wulfes, Borchen (DE); Stefan Adelbert, Delbrück (DE); Elisabeth Danger, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 801 days.

(21) Appl. No.: 14/030,733

(22) Filed: Sep. 18, 2013

(65) Prior Publication Data
US 2014/0124104 A1    May 8, 2014

(30) Foreign Application Priority Data

Nov. 7, 2012   (DE) .......................... 10 2012 110 649

(51) Int. Cl.
*B21D 22/22*   (2006.01)
*B21D 22/02*   (2006.01)
(Continued)

(52) U.S. Cl.
CPC ............. *B21D 22/022* (2013.01); *C21D 1/18* (2013.01); *C21D 1/34* (2013.01); *C21D 1/42* (2013.01);
(Continued)

(58) Field of Classification Search
CPC ... C21D 1/18; C21D 1/85; C21D 1/42; C21D 8/00; C21D 9/46; C21D 9/0062;
(Continued)

(56) References Cited

U.S. PATENT DOCUMENTS

| 4,843,218 A * | 6/1989 | Husslein | .................. H05B 3/72 |
| | | | 219/466.1 |
| 7,159,437 B2 * | 1/2007 | Schroth | .................. B21D 37/16 |
| | | | 72/342.8 |

(Continued)

FOREIGN PATENT DOCUMENTS

| DE | WO 2010048950 A1 * | 5/2010 | ................ B21J 1/06 |
| DE | 102010004081 | 3/2011 | |

(Continued)

OTHER PUBLICATIONS

English translation of WO 2010048950.*
Barbara Stumpp, "Weniger ist mehr", (Less is more) Blech, vol. May 2010, pp. 34-36.

Primary Examiner — David B Jones
(74) Attorney, Agent, or Firm — Henry M. Feiereisen LLC (57) ABSTRACT

A hot forming line for producing hot formed and press hardened steel sheet products, includes: a forming device; a heating device having a temperature treatment station, wherein the temperature treatment station includes an upper tool and a lower tool, and at least one temperature treatment source; and exchangeable temperature treatment plates for conductive temperature treatment of a blank or part inserted into the temperature treatment station, wherein the exchangeable temperature treatment plates are constructed for arrangement on the upper tool and/or the lower tool, and the temperature treatment source is constructed for heating or cooling the temperature treatment plates. The temperature treatment station is constructed for treating different regions of the blank or part with different temperatures by conductive contact of the temperature treatment plates with the blank of part.

17 Claims, 7 Drawing Sheets

(51) Int. Cl.

| | | |
|---|---|---|
| *C21D 9/00* | (2006.01) | |
| *C21D 1/18* | (2006.01) | |
| *C21D 8/00* | (2006.01) | |
| *C21D 1/42* | (2006.01) | |
| *C21D 9/46* | (2006.01) | |
| *C21D 1/34* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |
| C21D 1/673 | (2006.01) | |

(52) U.S. Cl.
CPC .............. *C21D 8/00* (2013.01); *C21D 8/005* (2013.01); *C21D 9/0062* (2013.01); *C21D 9/46* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); C21D 1/185 (2013.01); C21D 1/673 (2013.01); C21D 2221/00 (2013.01)

(58) Field of Classification Search
CPC .... C21D 1/185; C21D 2221/00; C21D 1/673; C21D 1/34; C21D 8/005; B22D 22/022; C22C 38/02; C22C 38/002; C22C 38/04; C22C 38/06; C22C 38/12; C22C 38/14
USPC .......................................................... 72/364
See application file for complete search history.

(56) References Cited

U.S. PATENT DOCUMENTS

| | | | |
|---|---|---|---|
| 7,704,447 | B2 | 4/2010 | Danger et al. |
| 2006/0159858 | A1 | 7/2006 | Danger et al. |
| 2007/0000709 | A1 | 1/2007 | Danger et al. |
| 2007/0257407 | A1 | 11/2007 | Danger et al. |
| 2008/0036124 | A1 | 2/2008 | Buschsieweke et al. |
| 2010/0199737 | A1 | 8/2010 | Pellmann et al. |
| 2010/0300584 | A1 | 12/2010 | Buschsieweke et al. |
| 2011/0094282 | A1* | 4/2011 | Overrath .............. B21D 22/022 72/342.1 |
| 2011/0232806 | A1 | 9/2011 | Pellmann et al. |
| 2011/0232808 | A1 | 9/2011 | Pellmann et al. |
| 2011/0233946 | A1 | 9/2011 | Pellmann et al. |
| 2011/0233966 | A1 | 9/2011 | Pellmann et al. |
| 2011/0233968 | A1 | 9/2011 | Pellmann et al. |
| 2011/0252849 | A1* | 10/2011 | Park ......................... C21D 1/26 72/38 |
| 2012/0006089 | A1 | 1/2012 | Pohl et al. |
| 2012/0023748 | A1 | 2/2012 | Pohl et al. |
| 2012/0073351 | A1* | 3/2012 | Maki ........................ C23C 2/12 72/364 |
| 2012/0174406 | A1 | 7/2012 | Troester et al. |
| 2012/0273098 | A1* | 11/2012 | Bohner .................. C22C 21/06 148/695 |
| 2012/0318415 | A1 | 12/2012 | Zimmermann et al. |

FOREIGN PATENT DOCUMENTS

| | | |
|---|---|---|
| DE | 102010033816 A1 | 12/2011 |
| DE | 102010048209 | 1/2012 |
| EP | 2 014 777 A1 | 1/2009 |
| EP | 2 182 081 A1 | 5/2010 |
| EP | 2 182 082 A1 | 5/2010 |
| WO | WO 2010/048950 A1 | 5/2010 |
| WO | WO 2010/048951 A1 | 5/2010 |

* cited by examiner

HOT FORMING LINE AND METHOD FOR PRODUCING A HOT FORMED AND PRESS HARDENED MOTOR VEHICLE PART

CROSS-REFERENCES TO RELATED APPLICATIONS

This application claims the priority of German Patent Application, Serial No. 10 2012 110 649.5, filed Nov. 7, 2012, pursuant to 35 U.S.C. 119(a)-(d), the disclosure of which is incorporated herein by reference.

BACKGROUND OF THE INVENTION

The present invention relates to a hot forming line and method for producing a hot formed and press hardened motor vehicle part The following discussion of related art is provided to assist the reader in understanding the advantages of the invention, and is not to be construed as an admission that this related art is prior art to this invention.

It is known from the state of the art to produce motor vehicle bodies from metallic materials. For this, in particular steel materials or lightweight metal materials are used. In recent years high-strength and ultra high-strength steel materials were used which have at least partially high strengths or ductile properties so that the strength and the crash performance of a vehicle body can be increased while at the same time saving weight.

For example DE 10 2010 004 081 B3 discloses a heat treatment method for producing steel sheet blanks with at least two micro-structural regions of different ductility. For this, a blank is first homogenously heated in a furnace to a temperature and subsequently at least sub regions of the blank are further heated in a heating station above the austenizing temperature (AC3). The blank is then form pressed and quench hardened.

DE 10 2010 048 209 B3 discloses a method for producing a hot formed and press hardened metal part, wherein the metal part is produced as motor vehicle structural part with different strength. For this an intermediate cooling step is provided in which a sheet metal blank, which is first heated in its entirety to above austenizing temperature, is intermediately cooled in a first region. The intermediate cooling can occur directly in the press-hardening tool. Due to the homogenous heating of the entire plate, this requires a high energy input, wherein an intermediate cooling in the press tool is often only sub-optimal due to energy related aspects.

It would therefore be desirable and advantageous to provide a method and a device with which it is possible to produce sheet metal parts that have regions of different strength properties, while using a low amount of energy and requiring low acquisition costs for a device.

SUMMARY OF THE INVENTION

According to one aspect of the present invention, a hot forming line for producing hot formed and press hardened steel sheet products, in particular for producing motor vehicle parts, includes a heating device and a forming device, wherein the heating device has a temperature treatment station with an upper tool and a lower tool. The temperature treatment station is characterized according to the invention in that it has at least one temperature treatment source for cooling or heating, and exchangeable temperature treatment plates on the upper tool or lower tool for conductive temperature treatment, wherein the temperature treatment plates can be heated or cooled by the temperature treatment source.

With the temperature treatment tool according to the invention it is possible to correspondingly temperate the sheet metal blanks and/or sheet metal parts which are to be treated in the hot forming line in an energetically sensible manner. The temperature treatment can for example include heating, in particular a heating or warming up to above AC3 temperature or a cooling or quenching. Within the framework of the invention it is possible due to the exchangeable temperature treatment plates to conductively heat sheet metal blanks i.e., flat parts and also three-dimensionally pre-formed or end-formed parts. In the conductive heating, the proportion of lost heat is especially low because heat transfer essentially occurs due to heat conduction via the temperature treatment plates to the blank to be heated or the part to be heated. Heat that is radiated off or incidentally heated heating spaces are completely avoided. The temperature treatment source, in particular the heat source thus heats the temperature treatment plate, wherein the upper and/or lower temperature treatment plate comes to form fittingly rest against the blank or the part by inserting a sheet metal blank or a part into the temperature treatment device and closing the temperature treatment device, and in this way conductively heat the blank or the part. Within the framework of the invention a one-sided contact is also possible.

A further important advantage of the present invention is that the high acquisition costs of the tool with corresponding temperature treatment devices and corresponding closing mechanics are only incurred once and the temperature treatment device can then be used flexibly in a broad range of applications by simple exchange of the temperature treatment plates. Thus, only the temperature treatment plates have to be renewed or exchanged but not the entire temperature treatment device. As a result, cumbersome retrofitting work is not required, and the production costs of the parts are kept low.

The temperature treatment plates may extend over the entire surface of the upper tool and/or the lower tool so that in the case of a blank a hollow space is formed between the temperature treatment plates when closing the temperature treatment device, which hollow space essentially covers the entire plate.

According to another advantageous feature of the present invention, the temperature treatment plates can be configured flat for temperature treatment of a sheet blank or three-dimensionally, wherein a hollow space remains between the temperature treatment plates when the temperature treatment station is closed. In the case of temperature treatment plates with flat configuration it is thus possible to conductively temperate, in particular heat a sheet metal blank by top-side contact with the temperature treatment plate on the upper tool and bottom-side contact with the temperature treatment plate on the lower tool.

According to another advantageous feature of the present invention, preformed parts may be heated by the three-dimensionally configured temperature treatment plates, wherein the hollow space between the temperature treatment plates of the closed temperature treatment station essentially corresponds to the contour of the already preformed part. In this regard it is further advantageous that the part is held centered and with this is fixed during the conductive temperature treatment thereby avoiding deformation.

According to another advantageous feature of the present invention, a temperature treatment source can be arranged in the upper and/or the lower tool. A temperature treatment source is in particular configured as electric resistance heating source or as burner or as inductive heat source. The temperature treatment source is integrated in or arranged on the upper or lower tool so that by exchanging the temperature treatment plate a heating preferably exclusively of the temperature treatment plate itself occurs. This reduces the energy required for heating the part to the essential amount so that by the at least regional contact a fast and efficient temperature treatment, in particular a heating of the sheet metal blank and/or the part occurs. In the case of an electric resistance heating, the temperature treatment plate is configured in a first embodiment especially preferably so that the temperature treatment plate is configured itself as electric resistor, wherein by applying a voltage essentially only the temperature treatment plate is heated but not the upper or the lower tool. As an alternative, an electric resistance heating source is arranged on the upper tool or lower tool so that by coupling with the temperature treatment plate a heating of the temperature treatment plate via the electric resistance heat source occurs.

When a burner is used the burner is preferably operated with fossil fuels as a fuel oil burner, wherein the burner is preferably arranged on the upper or lower tool so that its flame is directed to the temperature treatment plates to be coupled. Corresponding supply air and exhaust air for the combustion are then integrated in the upper tool or the lower tool.

According to another advantageous feature of the present invention, the burner can be constructed as a radiant tube which then temperates the temperature treatment plates from a back side.

A further preferred embodiment provides for an inductive heating, wherein corresponding induction means are integrated on or in the top tool or bottom tool so that the temperature treatment plate is temperated, in particular heated via the induction means, wherein the temperature treatment plate transfers its temperature or heat by means of heat conduction at contact with a blank or part to be heated. As an alternative, at least sections of the temperature treatment plate can be used for cooling, wherein then a channel is formed between the upper tool and the temperature treatment plate and the lower tool and the temperature treatment plate thereby establishing a cooling medium supply so that the cooling medium correspondingly cools the temperature treatment plate. The conductive contact between the blank or part to be cooled then result in cooling of the blank or part. Cooling of the blank or part within the context of the invention relates in particular to a targeted setting of a temperature below or to the starting temperature attained by the blank or part from the preceding heating, wherein for a holding of the temperature in a second region of the blank or part only the amount of heat is dissipated which is necessary for heat conduction within the plate or part, while for reducing the temperature of the part the temperature treatment plate is set to a lower temperature.

According to another advantageous feature of the present invention, hot air may be used for the temperature treatment. In this case corresponding channels can then be formed in the temperature treatment plates through which hot air flows or through which hot air is blown by a compressor or fan. Within the framework of the invention the temperature in the temperature treatment plate can also be set by steaming hot air over a bottom side of the temperature treatment plates.

The temperature treatment itself occurs in the temperature treatment station according to the invention so that first regions of the blank or part and second regions of the blank or part are treated with different temperatures. For this, the first regions are in direct contact with the temperature treatment plates when the temperature treatment station is closed and in the second regions between the surface of the part or the blank to be heated or between the part and the temperature treatment plate, a distance is formed so that an air gap is created or an insolating material is arranged in the temperature treatment plate in the second regions. This allows temperature treatment, in particular heating, of first regions directly and immediately by conductive contact. For this, the temperature treatment plates preferably have temperatures of more than 1000° C., in particular between 100° C. and 1500° C. so that in case of conductive contact a temperature above austenizing temperature, i.e., above AC3 temperature can be realized in the first regions of the blank or part to be heated.

According to another advantageous feature of the present invention, a hardenable steel may be used, in particular a boron manganese steel with good hot forming and tempering properties.

Particularly preferably, a heat treatable steel is used in the method according to the invention, which can be categorized as micro alloy heat-treatable steel. The latter has in particular the following alloy elements in weight percent:

| Carbon | (C) | 0.19 to 0.25% |
|---|---|---|
| Silicone | (Si) | 0.15 to 0.30% |
| Manganese | (Mn) | 1.10 to 1.40% |
| Phosphorous | (P) | 0 to 0.025% |
| Sulfur | (S) | 0 to 0.015% |
| Chromium | (Cr) | 0 to 0.35% |
| Molybdenum | (Mo) | 0 to 0.35% |
| Titanium | (Ti) | 0.020 to 0.050% |
| Boron | (B) | 0.002 to 0.005% |
| Aluminum | (Al) | 0.02 to 0.06% |
| Remainder iron and smelting related contaminations | | |

As an alternative it is also possible to use a steel alloy which has the following alloy components expressed in weight percent:

| Carbon | (C) | 0.14-0.3% |
|---|---|---|
| Manganese | (Mn) | 0.8-2.5% |
| Silicone | (Si) | 1.5-2.5% |
| Chromium | (Cr) | max. 0.4% |
| Aluminum | (Al) | max 0.1% |
| Nickel | (Ni) | max 0.3% |
| Boron | (B) | 0.0008-0.005% |
| Titanium | (Ti) | 0.005-0.1% |
| Niobium | (Nb) | max. 0.1% |
| Remainder iron and smelting related contaminations. | | |

The distance between the surface of the part and a surface of the temperature treatment plate in the second regions results in an insulation, i.e., a heat transfer due to heat conduction is prevented as a due to the air gap. As a result, the second regions are heat treated insignificantly or in the case of a preheated blank or part the second regions are essentially held at the preheated temperature. In order to prevent possible heat radiation into the air gap in the second regions, in a preferred embodiment an insulating material is arranged in the temperature treatment plates. This can be for example be a ceramic insulating material or another insulating material. Within the framework of the invention it is also possible that the temperature treatment plate carries out a combined heating and cooling process in two different regions at the same time. A first region is heated or is at least held at its temperature by a heat source, wherein a second region is cooled relative to the first region. Within the framework of the invention it is further advantageous when a heating paste is applied to at least the first regions for improving the heat conducting effect during the conductive temperature treatment.

According to another advantageous feature of the present invention, a heat conducting paste can be applied between the respective upper tool or lower tool and the temperature treatment plate.

In order to be able to use the temperature treatment station as universally as possible and in a broad range of applications, the temperature treatment station is configured so that a temperature treatment plate is coupled with the upper tool and another temperature treatment plate with the lower tool, wherein the temperature treatment plates are universally exchangeable for each application. Particularly preferably, the temperature treatment plates are form fittingly coupled to the upper tool and/or the lower tool, and are preferably secured via bolts. This enables adjusting the temperature treatment station to the respective application in a particularly short mounting time, and when changing the hot forming line in accordance with a new product only the temperature treatment plates have to be newly produced, but not the temperature treatment station with a costly closing mechanics and the costly temperature treatment sources.

According to another advantageous feature of the present invention, the hot forming line according to the invention can be constructed so that a furnace is arranged upstream of the temperature treatment station, wherein the blanks and/or parts i.e., the metal parts are homogenously preheated in the furnace to a temperature. For example the blanks and/or parts are preheated to a temperature above AC1, but below AC3, wherein at least first regions of the blank are further heated in the temperature treatment station to a temperature above AC3, and wherein second regions of the blank or part are for example held at a temperature between AC1 and AC3.

According to another advantageous feature of the present invention, a spacer can be arranged on the temperature treatment plate on the lower tool, wherein a blank or a part which is placed on the temperature treatment plate is supported by the spacer, in particular in the second regions so that here no conductive contact is established between the temperature treatment plate and the surface of the part. Further, when a second region extends over the entire border of the part, this prevents the risk that the sheet metal blank tilts during insertion into the temperature treatment station and thus inadvertently comes into contact with the temperature treatment plate.

According to another advantageous feature of the present invention, the temperature treatment plate may have a coating. The coating is particularly a scale-resisting coating so that a soot deposition, contamination or scaling of the surface of the temperature treatment plate can essentially be prevented and the operating costs of the temperature treatment station according to the invention can be kept low. Further the coating may be configured heat resistant so that a baking-in or adhesion of coatings of the blank or the part, or of a heat conducting paste are prevented. Further, the coating can be configured wear resistant, so that the temperature treatment plate can be used over a cycle of a product series with negligible wear.

According to another advantageous feature of the present invention, the blank or the part can be coated for example by an aluminum silicone coating or a zinc coating, wherein the coating already unites with the surface of the part in the furnace or the coating unites with the surface of the part during the temperature treatment process in the temperature treatment station.

The present invention further relates to a method for producing a hot formed and press hardened motor vehicle part with a hot forming line which includes at least one of the above mentioned features, wherein the method is characterized by the following method steps:
heating a blank to a temperature below AC3,
transferring the blank in a temperature treatment station,
heating first regions of the blank in the temperature treatment station by means of conductive heating to above AC3,
holding second regions of the blank at a temperature below AC3,
transferring the sheet metal plate into a forming tool, and
forming and press hardening the blank.

Accordingly, a blank is first heated homogenously to a temperature below AC3, preferably in a furnace. The thus preheated blank is then transferred into the temperature treatment station according to the invention, wherein by conductive heating in the temperature treatment station first regions of the blank are heated to a temperature above AC3, wherein second regions of the blank are held at a temperature below AC3, in particular at a temperature to which the blank or part was first heated. In the course of this, transition regions between the first regions and the second regions within the range of 30 mm, in particular smaller than 20 mm are realized.

Subsequent to the temperature treatment in the temperature treatment station, the heat treated sheet metal blank is transferred into a forming tool, hot formed in the forming tool and press hardened by rapid subsequent cooling. This results in a part that has at least two regions with different strength properties and/or ductility properties, wherein between the regions a clearly defined, in particular small transition region of less than 30 mm, in particular of less than 20 mm is formed. The targeted temperature treatment with the temperature treatment station according to the invention further allows heating the blanks or parts energetically optimally and in a targeted manner to temperatures of more than 900° C., so that heat loss during the temperature treatment is avoided as far as possible.

A further embodiment of the method according to the invention provides for the following method steps:
heating a blank to a temperature greater or equal to AC3,
transferring the blank into a temperature treatment station,
cooling second regions of the blank to a temperature below AC3,
holding first regions of the blank at a temperature above AC1, in particular above AC3,
transferring the temperature treated sheet metal blank into a forming tool, and
hot forming and press hardening the blank.

According to another advantageous feature of the present invention, the blank can first be heated to below AC1, wherein the region of the second type in the temperature treatment station itself is held at a temperature below AC1. As an alternative the part can also be first heated to below AC1 i.e., to a temperature of 500 or 600° C. so that the energy expenditure for preheating is only minor and subsequent thereto a post heating occurs by the conductive heating in the temperature treatment station according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
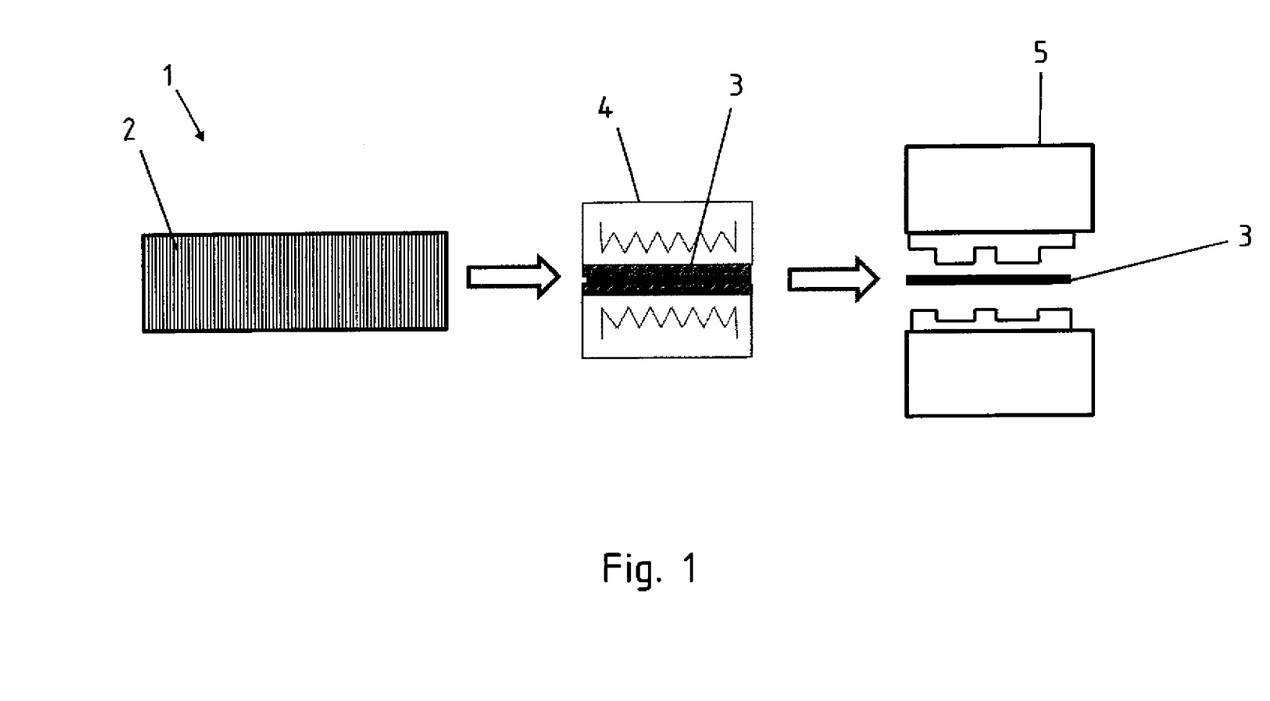
FIG. 1 shows a hot forming line according to the invention.

Turning now to the drawing, and in particular to FIG. 1, there is shown a hot forming line 1 according to the invention, wherein the hot forming line 1 has a furnace 2 for homogenously heating a blank 3. After the heating in the furnace, the blank 3 is transferred into a temperature treatment station 4 according to the invention for the here shown targeted post-heating. After finishing the temperature treatment in the temperature treatment station 4, the blank 3 is transferred into a forming tool 5, wherein it is hot formed in the forming tool 5 and subsequently quenched and thereby press hardened.

Figure 2:
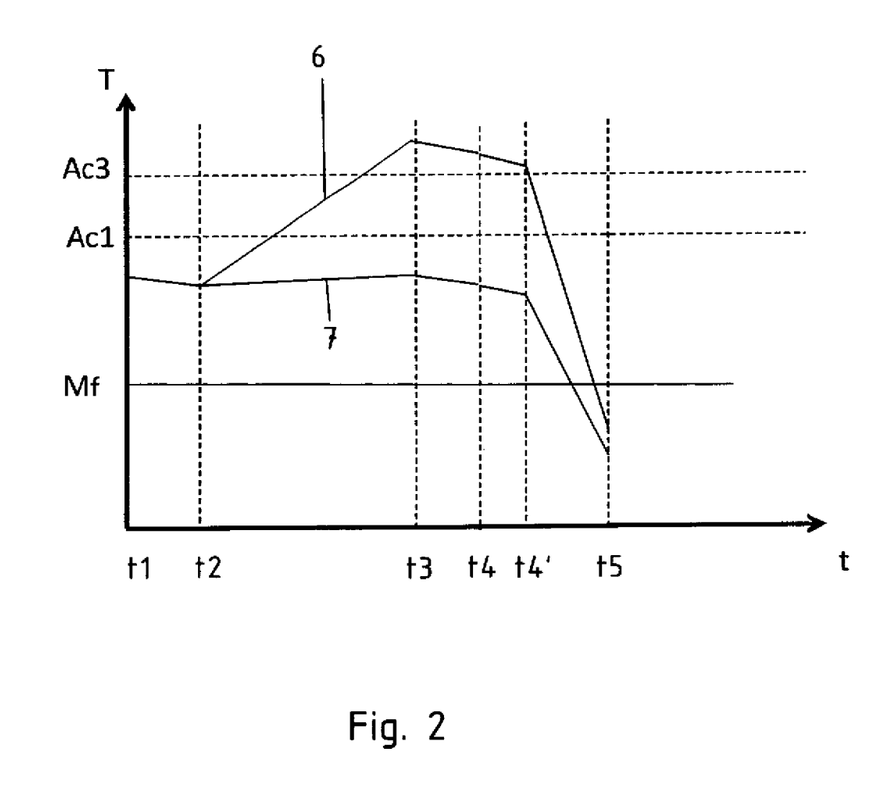
FIG. 2 shows the temperature profile of the heating with a hot forming line according to the invention.

FIG. 2 shows different time points t1 to t5 at which the blank 3 passes thorough the different stations of the hot forming line and has corresponding temperatures. For this, the part or the blank 3 starts at a temperature below AC1 at the time point t1. Upon transfer into the temperature treatment station 4, first regions of the blank 3 are heated starting from the temperature treatment in the temperature treatment station 4 at the time point t2 to a temperature above AC3, which is shown by the curve 6. Second regions of the blank 3, which are indicated by the curve 7 essentially remain at the temperature after exiting the furnace 2.

At the time point t3 heating in the temperature treatment station 4 is finished and the blank 3 is transferred into a forming tool 5. Subsequent thereto the blank is formed, wherein both regions are already slightly cooled as a result of contact with the forming tool 5. At the time point t4' the quenching process starts in the forming tool 5 and the first regions 6 and the second regions 7 are cooled from above AC3 to below AC1 so that an essentially martensitic microstructure forms in the first regions 6, and a more ductile microstructure in the second regions 7. This can for example be a ferritic-perlitic martensitic microstructure. The cooling process is finished at the time point t5 and the finished formed and press hardened part is removed from the forming tool.

Figure 3:
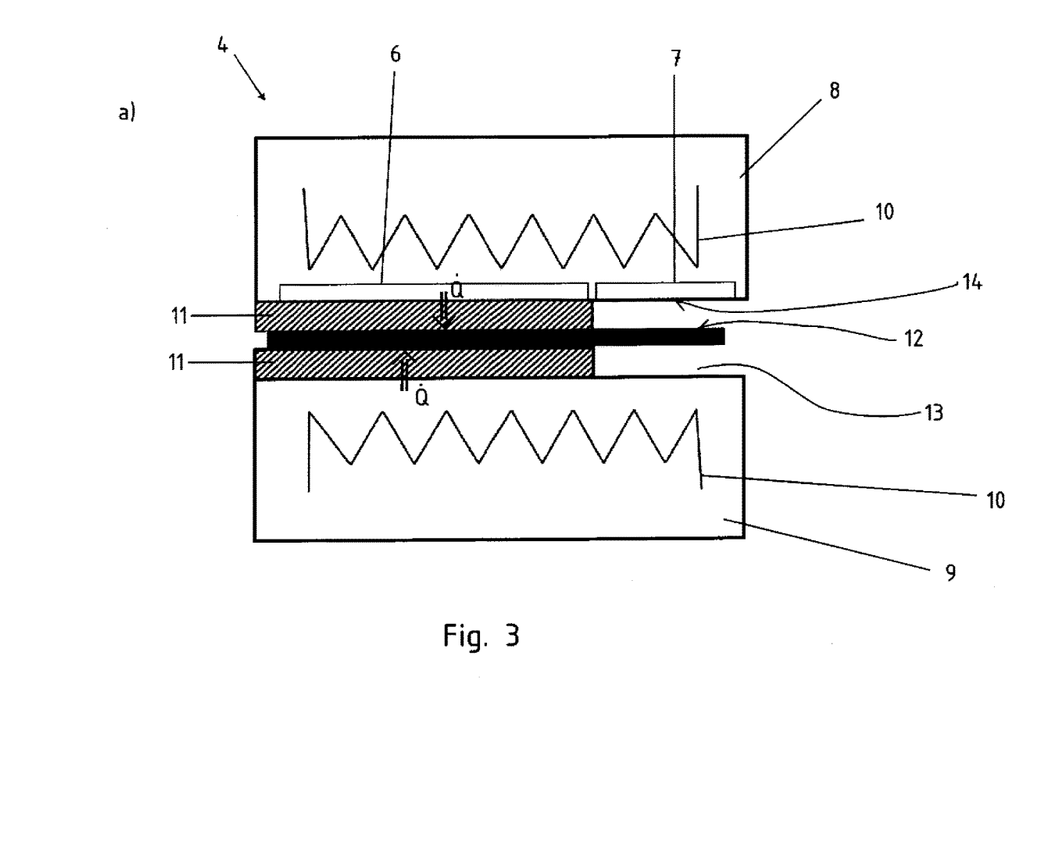
FIGS. 3a and 3b show a cross section through a temperature treatment station according to the invention.

FIGS. 3a and 3b show a cross sectional view through a temperature treatment station 4 according to the invention, wherein the temperature treatment station 4 has an upper tool 8 and a lower tool 9 and a temperature treatment source 10, here shown in the form of a resistance heating device, integrated in the upper tool 8 and the lower tool 9. Further, the temperature treatment device 4 has in first regions 6 a temperature treatment plate 11 at the upper tool 8 and also a temperature treatment plate 11 at the lower tool 9. By means of the temperature treatment plates 11 a heat transfer $\dot{Q}$ occurs through conduction from the temperature treatment source 10 via the temperature treatment plate 11 to the surface of the part and thus into the blank 3. In the second regions 7 on the other hand, an air gap 13 is formed between the part surface 12 and a tool surface 14 so that essentially no heat transfer $\dot{Q}$ or heat introduction occurs in the second regions 7.

FIG. 3b shows an embodiment analogous to the one of FIG. 3a, wherein in the second regions 7 between the respective upper tool 8 or lower tool 9 and the surface of the blank 3 a respective insulating plate 15 is incorporated which enables preventing a heat introduction as a result of heat radiation compared to the embodiment of FIG. 3a.

According to the invention, the temperature treatment plates 11 are exchangeable so that the upper tool 8 and the lower tool 9 of the temperature treatment station 4 can be used universally and in a broad range of applications by simple exchange of the temperature treatment plates 11, so that the acquisition costs for tools can be kept low.

Figure 4:
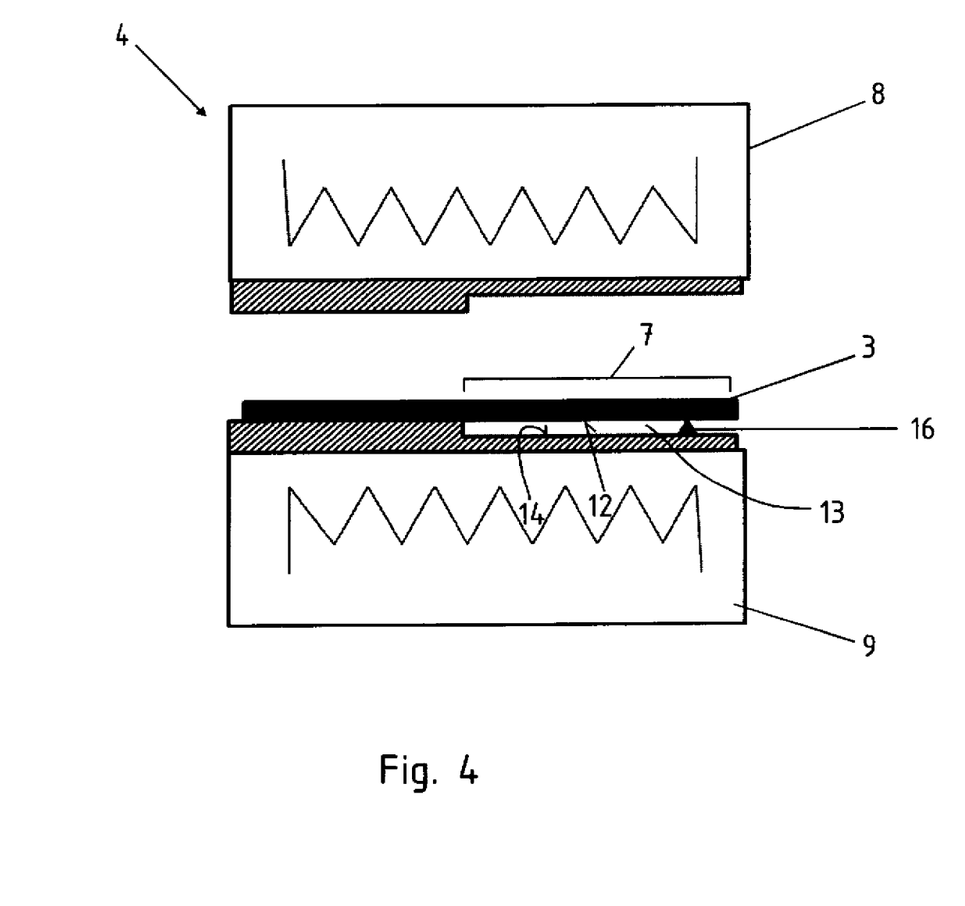
FIG. 4 shows a temperature treatment station according to the invention with spacer.

In the application of FIG. 4, a spacer 16 is additionally arranged in the second regions 7 in which an air gap 13 is formed between part surface 12 and tool surface 14, so that on one hand the surface of the blank 3 in the second regions 7 does not come into contact with the tool surface 14, and on the other hand tilting of the blank 3 is prevented when closing the upper tool 8 and lower tool 9 which would otherwise cause a high fluctuation of production tolerances.

Figure 5:
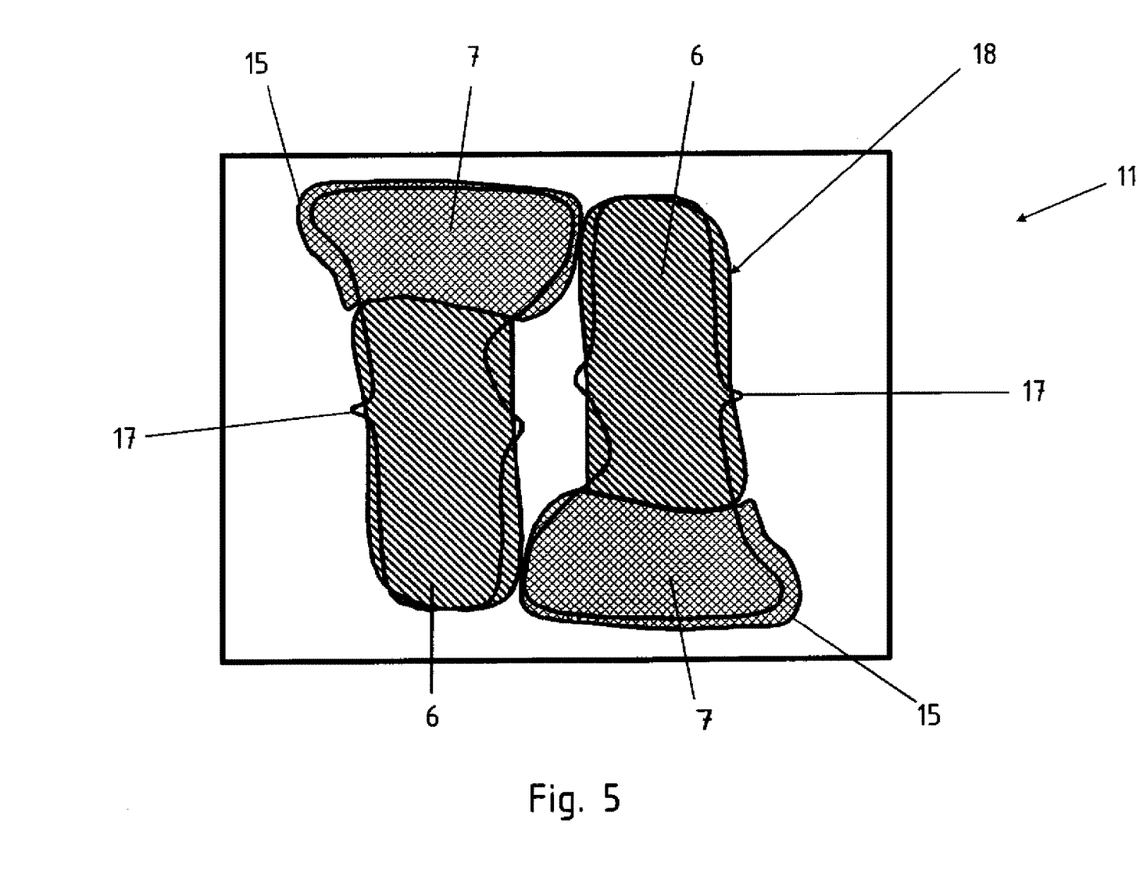
FIG. 5 shows a temperature treatment station with two placed on plate to be temperature treated.

FIG. 5 shows a temperature treatment plate 11 in a top view with cut-to-size metal sheets 17 placed on the temperature treatment plate 11. The temperature treatment plate 11 is configured so that insulating plates 15 are arranged in second regions 7, and in first regions 6 the temperature treatment plates are configured so that they come into conductive contact with the first regions 6 essentially with their full surface. Only slight overlaps occur between the border of the part and the border of the contact between temperature treatment plate 11 and the part and the border of the contact between the temperature treatment plate 11 and the part and the insulating plate 15 so that energy influx into the parts themselves is as efficient as possible and strong heat losses which for example are dissipated to the environment are avoided.

Figure 6:
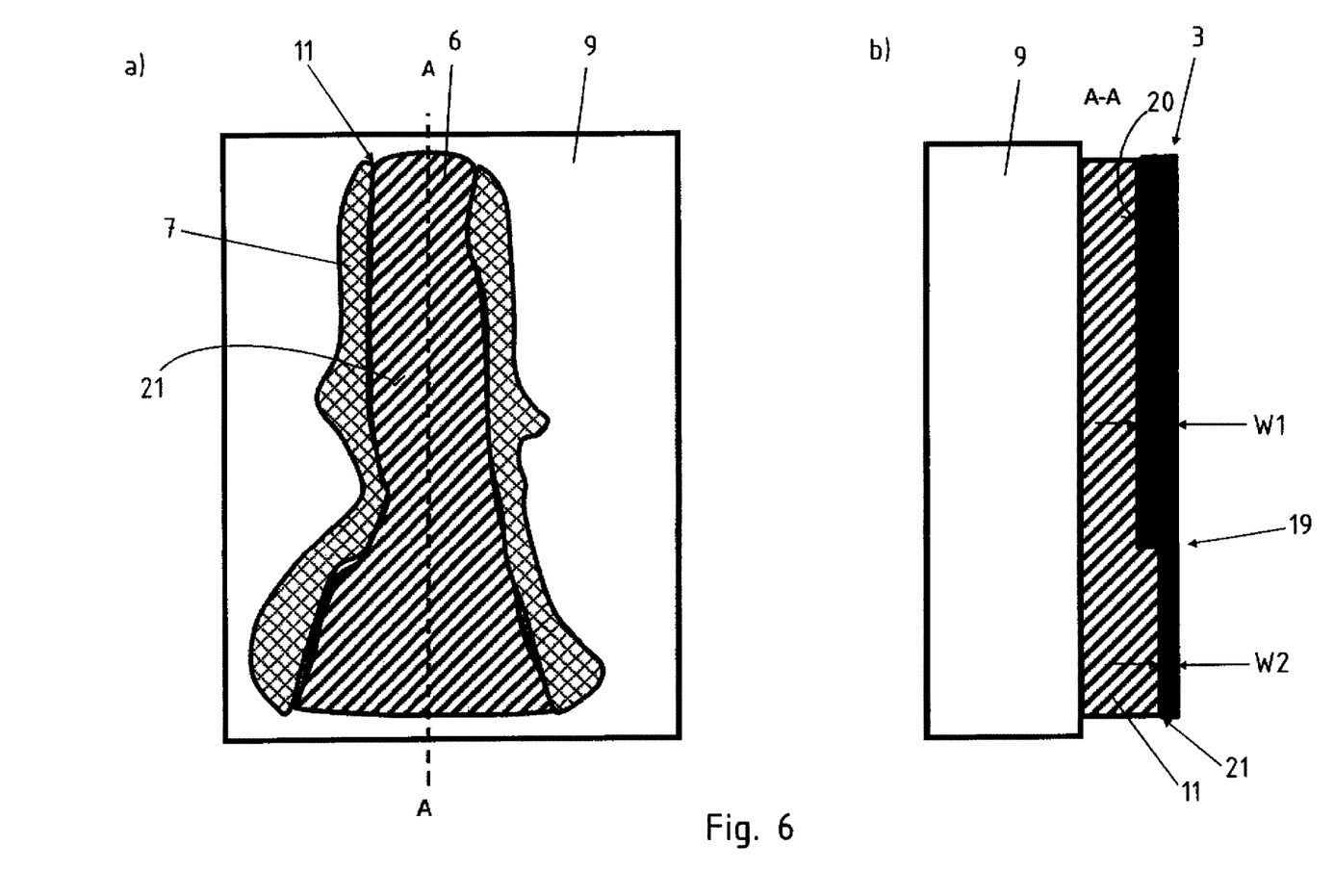
FIGS. 6a and 6b show a top view and side view of a temperature treatment plate with thickness step.

FIG. 6a shows a temperature treatment plate 11 in a top view onto a lower tool 9 without a blank being placed on the temperature treatment plate 11. The temperature treatment plate 11 again has a first region 6 and a second region 7, which can be subjected to different temperature treatment. FIG. 6b shows a side view along the line A-A however with placed-on blank 3. The blank 3 rests on the temperature treatment plate 11, wherein the temperature treatment plate 11 is fastened on a lower tool 9. The blank 3 has a thickness step 19, which is mirror symmetrically formed on the temperature treatment plate 11. Thus, a bottom side 20 of the blank 3 comes into form fitting contact on a surface 21 of the temperature treatment plate 11. This enables homogeneously heating a blank 3 having two different wall thicknesses W1, W2, in the region of the thickness step 19, wherein the wall thickness W1 is greater than the wall thickness W2. The temperature treatment station 4 can thus be easily adjusted to a respective blank 3 to be heated by simple exchange of the temperature treatment plate 11.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A hot forming line for producing hot formed and press hardened steel sheet products, comprising:
    a forming device;
    a heating device having a temperature treatment station, said temperature treatment station including an upper tool and a lower tool, and at least one temperature treatment source; and
    exchangeable temperature treatment plates for conductive temperature treatment, said exchangeable temperature treatment plates being constructed for arrangement on the upper tool and/or the lower tool, said temperature treatment source being constructed for heating or cooling the temperature treatment plates, wherein the temperature treatment plates are constructed for treating a first region and a second region of a part inserted in the temperature treatment station with different temperatures, and wherein in a closed state of the temperature treatment station the first region is in direct contact with the temperature treatment plates and in the second region a distance is formed between a surface of the part and the temperature treatment plate or a tool surface.

2. The hot forming line of claim 1, wherein the temperature treatment plates are configured flat for temperature treatment of a sheet metal blank.

3. The hot forming line of claim 1, wherein the temperature treatment plates are configured three-dimensional, and wherein a hollow space remains between the temperature treatment plates in a closed state of the temperature treatment station.

4. The hot forming line of claim 1, wherein the temperature treatment source is arranged in the upper tool and/or the lower tool.

5. The hot forming line of claim 1, wherein the temperature treatment source is a member selected from the group consisting of an electric resistance heating, a burner, an inductive heat source and an electromagnetic heat source, and wherein the temperature treatment plate is heatable to above 1000° C.

6. The hot forming line of claim 5, wherein the burner is constructed as a radiant tube.

7. The hot forming line of claim 1, wherein the temperature treatment source is hot air, and wherein the temperature treatment plate is heatable to above 1000° C.

8. A hot forming line for producing hot formed and press hardened steel sheet products, comprising:
    a forming device;
    a heating device having a temperature treatment station, said temperature treatment station including an upper tool and a lower tool, and at least one temperature treatment source; and
    exchangeable temperature treatment plates for conductive temperature treatment, said exchangeable temperature treatment plates being constructed for arrangement on the upper tool and/or the lower tool, said temperature treatment source being constructed for heating or cooling the temperature treatment plates, wherein the temperature treatment plates are constructed for treating a first region and a second region of a part inserted in the temperature treatment station with different temperatures, and wherein in a closed state of the temperature treatment station the first region is in direct contact with the temperature treatment plates and an insulating material is arranged in the temperature treatment plates in the second region.

9. The hot forming line of claim 1, wherein one of the temperature treatment plates is coupled with the upper tool and/or another one of the temperature treatment plates is coupled with the lower tool.

10. The hot forming line of claim 9, wherein the one and the other temperature treatment plates are respectively coupled form fittingly to the upper tool and/or or the lower tool.

11. The hot forming line of claim 10, wherein the one and the other temperature treatment plates are respectively coupled to the upper tool and/or the lower tool via bolts.

12. The hot forming line of claim 1, further comprising a furnace arranged upstream of the temperature treatment station for pre-heating the part to a temperature.

13. The hot forming line of claim 9, wherein at least the temperature treatment plate coupled to the lower tool has a spacer, and wherein a blank or part placed on the temperature treatment plate is supported by the spacer.

14. The hot forming line of claim 13, wherein the blank or part is supported by the spacer in the second regions.

15. The hot forming line of claim 1, wherein the temperature treatment plates have a coating.

16. The hot forming line of claim 15, wherein the coating is a scale resisting coating.

17. The hot forming line of claim 1, for producing motor vehicle parts.

* * * * *